United States Patent [19]

Perfect et al.

[11] Patent Number: 5,511,979
[45] Date of Patent: Apr. 30, 1996

[54] MOTION SYSTEM INCLUDING ACTUATOR ASSEMBLY

[75] Inventors: Lawrence J. Perfect; Peter Waller, both of Sussex, United Kingdom

[73] Assignee: Hughes Rediffusion Simulation Limited, Sussex, United Kingdom

[21] Appl. No.: 170,207

[22] PCT Filed: Jun. 1, 1992

[86] PCT No.: PCT/GB92/00984

§ 371 Date: Jan. 19, 1994

§ 102(e) Date: Jan. 19, 1994

[87] PCT Pub. No.: WO93/00666

PCT Pub. Date: Jan. 7, 1993

[30] Foreign Application Priority Data

Jun. 29, 1991 [GB] United Kingdom ............... 9114124

[51] Int. Cl.⁶ ........................................................ G09B 9/14
[52] U.S. Cl. ............................. 434/58; 434/55; 472/130
[58] Field of Search ............................... 434/29, 30, 55, 434/57, 58; 472/1, 130

[56] References Cited

U.S. PATENT DOCUMENTS

| | | | |
|---|---|---|---|
| 3,295,224 | 1/1967 | Cappel et al. | 434/58 |
| 3,496,650 | 2/1970 | Kimball et al. | 434/55 |
| 3,577,659 | 5/1971 | Kail | 434/58 |
| 3,967,387 | 7/1976 | Marchegiani | 434/58 |
| 4,343,610 | 8/1982 | Chou | 434/58 |
| 4,536,690 | 8/1985 | Belsterling et al. | 434/58 X |
| 4,753,596 | 6/1988 | Hart et al. | 434/58 X |

FOREIGN PATENT DOCUMENTS

WO80/00507  3/1980  WIPO.

*Primary Examiner*—Gene Mancene
*Assistant Examiner*—Jeffrey A. Smith
*Attorney, Agent, or Firm*—Nixon & Vanderhye

[57] ABSTRACT

An actuator assembly comprising a pair of interconnected extensible actuators defining two sides of a triangle structure, and a linkage constrained to move with the actuators such that differences in extension of the actuators cause a change in position of the linkage. Changes in position of the linkage are detected to enable relative actuator extensions to be monitored.

24 Claims, 3 Drawing Sheets

5,511,979

MOTION SYSTEM INCLUDING ACTUATOR ASSEMBLY

BACKGROUND

I. Field of the Invention

The present invention relates to an actuator assembly, particularly but not exclusively applicable to the support of motion platforms for vehicle simulators.

II. Related Art and Other Considerations

Vehicle simulators are widely used in training or entertainment applications. One major area of use is in the training of aircraft pilots.

In a typical aircraft flight simulator, a trainee pilot sits in a mock cockpit and views an image visible through the cockpit windows. Often the mock cockpit is supported on a motion platform so that the physical effects of vehicle motion can be simulated to supplement the simulation of aircraft motion represented by the visual image. Typically the mock cockpit is supported on six hydraulic actuators. The hydraulic actuators are connected between three pivots on the underside of the platform and three pivots on a support base beneath the platform. Thus each platform pivot is connected to two actuators which are in turn connected to respective ones of a pair of the support base pivots. In plan view, the pivots are arranged in a hexagonal shape, the platform pivots and support base pivots alternating around the periphery of the hexagon. This actuator system provides for movement about 6 axes providing translational (vertical, longitudinal or lateral) and rotational (pitch, roll and heave) displacements.

The conventional actuator system works well for standard sized flight simulators. If the size of the motion platform of the flight simulator is increased, the size of the conventional actuator system must be increased accordingly. This causes a problem when it is desired to use a large motion platform suitable for supporting for example a representation of a passenger aircraft fuselage to be used for emergency evacuation training, where the actuators would have to be very long.

The problem of large actuator size with large motion platforms can be addressed by widening the system base (ie providing six support base pivots so as to move the pairs of actuators further apart) and reducing the actuators maximum extensions. However, such an arrangement would cause problems of over-angling. That is to say the ends of the platform could strike the support base.

In some large motion platform systems, acceptable performances can be achieved with systems having three degrees of freedom. A three axis system has been proposed having three servo-controlled actuators and various methods of constraint, for example, "scissors", "hanging links" and cascade mechanisms where one axis is built upon another. Such three axis systems provide for pitch, heave and roll, but the methods of constraint and cascade mechanisms are complex and costly.

SUMMARY

It is an object of the present invention to provide an actuator assembly which can be built from conventional actuator components to provide a three axis motion platform support system.

According to the present invention there is provided an actuator assembly comprising a pair of interconnected extensible actuators, a linkage constrained to move with the actuators such that differences in extension of the actuators cause a change in position of the linkage, and means for detecting changes in position of the linkage.

Preferably the linkage comprises an elongate rod which may be mounted so as to be equi-distant between the actuators. A sleeve may be slidably mounted on the rod and connected to a pair of arms, each of the arms being connected to a respective one of the pair of actuators. Preferably the arms are pivotally connected to the actuators and the sleeve. The actuators may be pivotally connected together, and may be pivotally mounted on respective pivots located on a supporting surface to define a triangular structure. The rod may be pivotally mounted on the supporting surface between the actuator pivots.

Preferably means are provided to control the actuators such that the linkage is maintained in a datum position. A warning output may be generated in the event of the linkage being displaced from the datum position.

A motion system platform may be supported on one or more of the actuator assemblies. Preferably there are three actuator assemblies. A vehicle simulator may be mounted on the platform.

Thus, the triangular structure formed by the two hydraulic actuators and the supporting surface may be maintained isosceles at all times. This ensures that the actuators are extended and retracted in phase and with equal amplitude.

BRIEF DESCRIPTION OF THE DRAWINGS

A specific embodiment of the present invention will now be described by way of example, with reference to the accompanying drawings, in which.

DETAILED DESCRIPTION OF THE DRAWINGS

Figure 1:
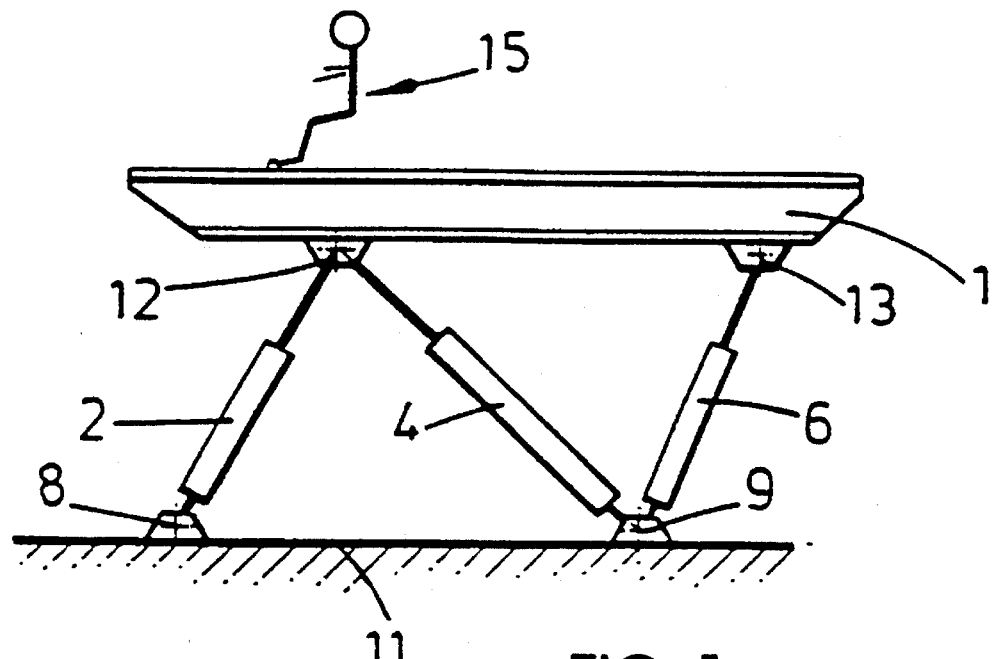
FIG. 1 is a schematic illustration of the basic components of a motion system of a conventional six axis motion platform.
Figure 2:
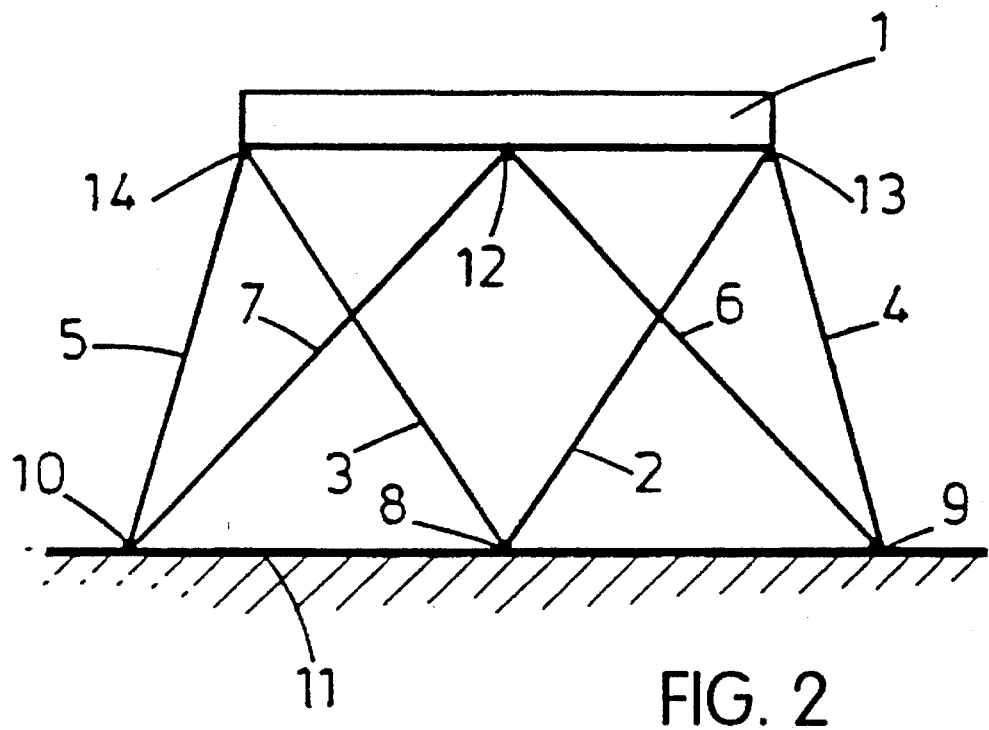
FIG. 2 is a schematic illustration of the arrangement of hydraulic actuators in a motion system of the type shown in FIG. 1.
Figure 3:
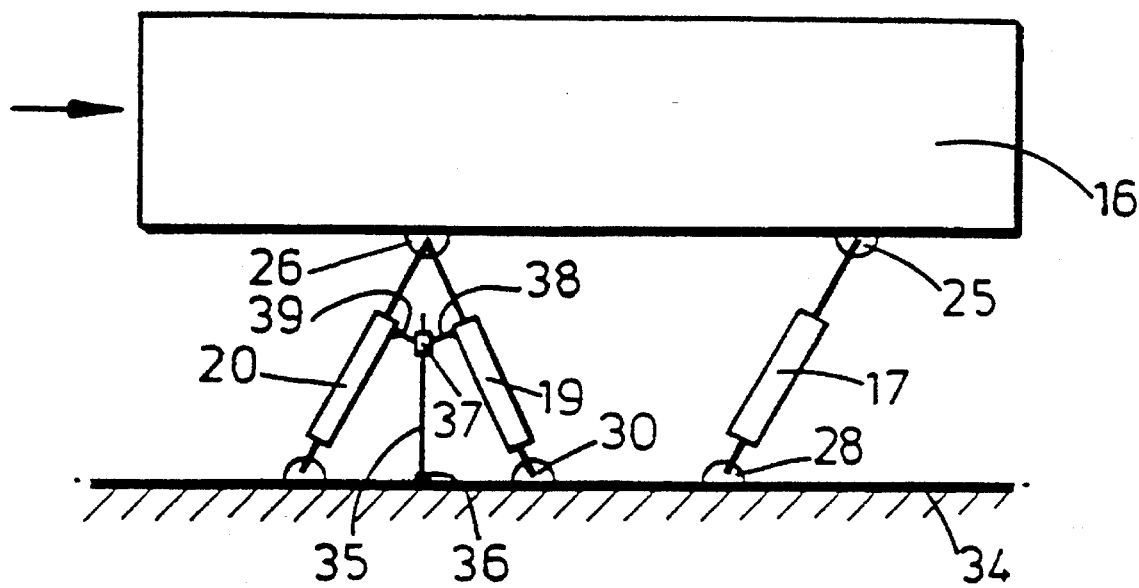
FIG. 3 is a schematic illustration of the basic components of a motion system according to an embodiment of the present invention.
Figure 4:
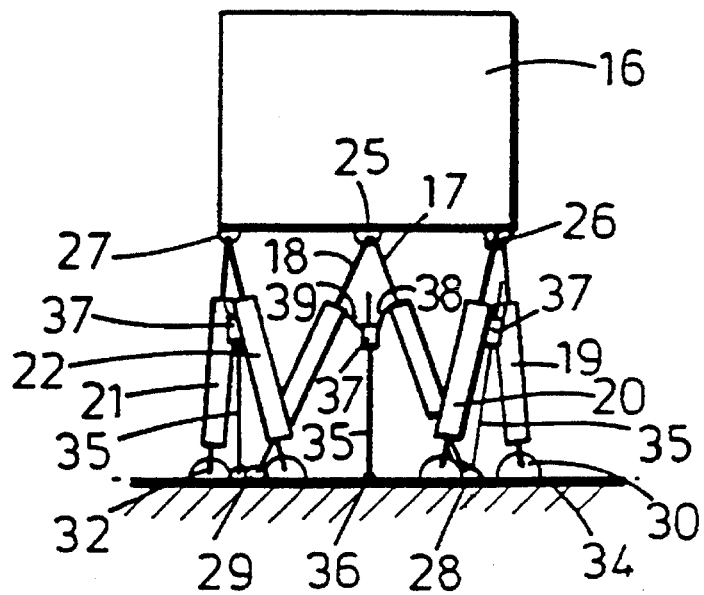
FIG. 4 is a schematic illustration of the basic components shown in FIG. 3 and viewed along the direction of the arrow of FIG. 3.

Referring to FIGS. 1 and 2, a conventional six axis motion system comprises a motion platform 1 which is positioned on six hydraulic actuators 2,3,4,5,6, and 7. The six actuators 2 to 7 are connected at their lower ends to three pivot points 8, 9, 10 which are securely mounted on a supporting floor 11. The upper ends of the actuators are connected to pivot points 12, 13, 14 mounted on the underside of the motion platform 1. A trainee pilot is indicated by the FIG. 15.

Referring now to FIGS. 3, 4, 5 and 6, the illustrated motion system comprises a motion platform 16 positioned on six hydraulic actuators 17,18,19,20,21, and 22. The motion platform is of generally rectangular shape and has dimensions typically of 16.8 m (55 ft)×6.7 m (22 ft)×5.5 m (18 ft). The actuators 17 to 22 are of a standard form as used in conventional six-axis systems, with a piston 23 located in an actuator body 24, in which the piston 23 is slidable, and are grouped into 3 pairs. Each pair of actuators is connected at upper ends of the pistons 23 to a pivot point 25, 26, 27 mounted on the underside of the motion platform 16. Pivot point 25 is located towards one end of the motion platform mid-way between the side edges of the platform. Pivot points 26, 27 are located opposite one another at the edges of the platform towards the other end of the platform from pivot point 25. Pivot points 25,26,27 are all approximately equi-distant from the centre of mass of the platform. The lower ends of actuators 17 to 22 are connected to six pivot points 28,29,30,31,32, and 33 which are securely mounted on a supporting floor 34. Each pair of actuators forms an isosceles triangle with the floor 34. Actuators 17 and 18 are pivoted to pivot point 25 and pivot points 28 and 29. Pivot points 28 and 29 are situated further towards the centre of mass of the platform than pivot point 25, so that actuators 17 and 18 are inclined at an angle to the vertical. Pivot points 30 and 32 are located below the edge of the platform. Pivot points 31 and 33 are located beneath the platform, further towards the end of the platform and further towards the centre of the platform than pivot points 26 and 27. Thus actuators 19, 20, 21 and 21 are inclined at an angle to the vertical.

A control rod 35 is provided for each pair of actuators. The control rod is pivoted to the floor at a pivot point 36 mid-way between the actuators. The control rod is provided with a sleeve 37, slidable on the control rod. Two arms 38, 39 are pivoted to the sleeve 37 at pivot points 40, 41. The other end of each arm 38, 39 is pivoted to pivot points 42, 43 on the actuator body 24. Pivot points 42,43 are situated at an upper end of the actuator body 24, in a position facing the control rod 35. The control rods are inclined at an angle to the vertical because the actuators are so inclined.

As the actuators are extended or retracted, the arms 38, 39 cause the sleeve 37 to slide up or down the control rod 35. If extension or retraction of the pair of actuators is equal, there is no lateral force on the control rod 35. The control rod thus remains in the same position, spaced equi-distant between the actuators. If the extension of the pair of actuators are unequal, a lateral force is applied to the control rod via the arms 38, 39, and the control rod pivots about pivot point 36. Movement of the control rod 35 is utilised to initiate actions as required to remedy the imbalance in extension of the actuators. For example, the system could be shut down, feedback could be applied to a control loop, or hydraulic flow to or from the actuators could be controlled, depending on the situation.

The triangle formed by a pair of actuators is free to rotate about a line joining the pivot points between the actuators and the supporting surface (for example, pivot points 28, 29), in response to movement of the other pairs of actuators. The control rod would also pivot about this line, without causing a lateral force to be exerted on the rod.

Extending and retracting all six actuators simultaneously gives heave. Roll is obtained by extending actuators 19 and 20 in opposite phase to actuators 21 and 22 (or vice versa), with actuators 17 and 18 static. Pitch is obtained by moving actuators 17 and 18 out of phase with actuators 19, 20, 21, 22.

Thus the positions of the control rod 35 give an immediate indication of any difference between the lengths of the associated pairs of actuators. Generally, extensions of the pairs of actuators will be locked in amplitude and phase using conventional servo control methods, but in the event of failure of such control methods the control rods 35 will indicate failure and enable appropriate actions to be taken. High levels of system security and safety can therefore be achieved.

Figure 5:
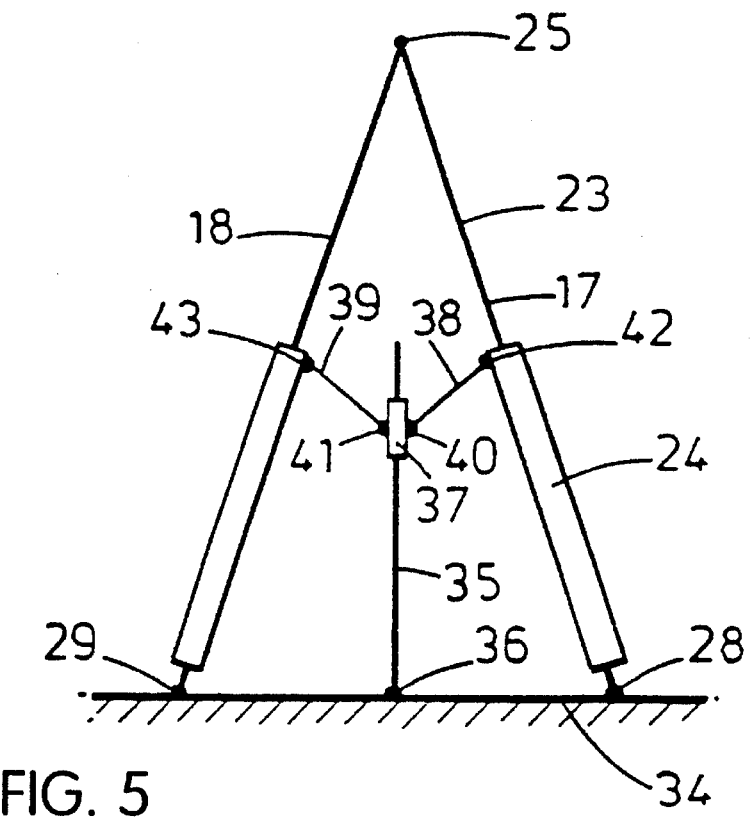
FIG. 5 is a schematic illustration of one of the pairs of hydraulic actuators shown in FIG. 3.
Figure 6:
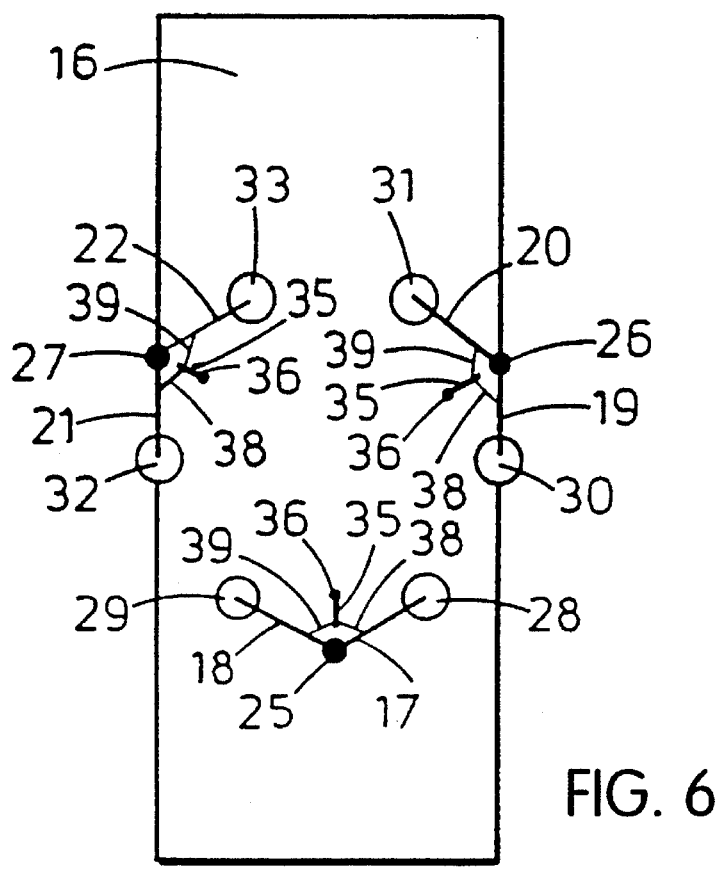
FIG. 6 is a plan view of the positions of the hydraulic actuators in the embodiment of FIG. 3.

In the arrangement illustrated in FIG. 5, the sleeve 37 is linked to the pivot points 42 and 43 and controls the angular position of the control rod 35. Other arrangements are possible however. For example, a telescopic or otherwise extensible rod could be connected at one end to the mid-point between the pivots 28 and 29 of FIG. 5 and at the other end to the pivot 25. If the two jacks were intended to be of equal length at all times, the angular position of the telescopic control rod would be constant in all normal conditions, and therefore any displacement of the control rod would indicate a problem.

We claim:

1. An actuator assembly comprising:

a pair of interconnected extensible actuators, the actuators being driven in unison and defining two sides of a triangle, a linkage constrained to move with the actuators such that differences in extension of the actuators cause a change in position of the linkage, the linkage comprising an elongate rod mounted between the actuators, a sleeve being slidably mounted on the rod and connected to a pair of arms; each of the arms being connected to a respective one of the pair of actuators, and means for detecting changes in position of the linkage.

2. An actuator assembly according to claim 1, wherein the arms are pivotally connected to the actuators and the sleeve.

3. An actuator assembly according to claim 1, wherein the actuators are pivotally connected together and pivotally mounted on respective pivots located on a supporting surface to define a triangular structure.

4. An actuator assembly according to claim 1, wherein means are provided to control the actuators such that the linkage is maintained in a datum position.

5. An actuator assembly according to claim 4, wherein a warning output is generated in the event of the linkage being displaced from the datum position.

6. An actuator assembly according to claim 1, wherein a position of the linkage is substantially constant so long as the actuators are driven in unison.

7. An actuator assembly according to claim 1, wherein the triangle is an isosceles triangle.

8. An actuator assembly according to claim 1, wherein the actuators are used to apply a force to a load and constrain the load from moving in a lateral direction in a plane of the triangle formed by the actuator pair.

9. A motion system comprising:

at least one actuator assembly, said at least one actuator assembly comprising:

a pair of interconnected extensible actuators, the actuators being driven in unison and defining two sides of a triangle;

a linkage constrained to move with the actuators such that differences in extension of the actuators cause a change in position of the linkage; and means for detecting changes in the position of the linkage; and a platform supported on said at least one actuator assembly.

10. An actuator assembly comprising:

three pairs of interconnected extensible actuators, the actuators of each pair being driven in unison and defining two sides of a triangle, a linkage for each pair of actuators, each linkage being constrained to move with its pair of actuators such that differences in extension of the actuators cause a change in position of the linkage, and means for detecting changes in position of each linkage, wherein the three pairs of interconnected extensible actuators are positioned between a motion platform and a supporting floor, the motion platform having lateral edges and longitudinal edges, each pair of actuators being connected to a corresponding one of three pivot points on an underside of the motion platform, each of the three pivot points being substantially equi-distant from a center of mass of the motion platform; and wherein a first of the three pivot points on the underside of the motion platform is mid-way between longitudinal edges of the motion platform, and wherein a second of the three pivot points on the underside of the motion platform is at a first longitudinal edge of the motion platform, and wherein a third of the three pivot points on the underside of the motion platform is at a second longitudinal edge of the motion platform.

11. An actuator assembly according to claim 10, wherein the actuators of each pair are connected to respective pivot points on the supporting floor, and wherein a first pair of actuators has a first actuator of its pair connected to a first pivot point on the supporting floor, the first pivot point on the supporting floor of the first actuator of the first actuator pair being spaced away from the first longitudinal edge of the motion platform but closer to a lateral edge of the motion platform than the pivot point on the underside of the motion platform to which the first actuator of the first actuator pair is attached, the second actuator of the first actuator pair being connected to a second pivot point on the supporting floor, the second pivot point being beneath the first longitudinal edge of the motion platform.

12. An actuator assembly according to claim 10, wherein the actuators of each pair are connected to respective pivot points on the supporting floor, and wherein a first and second actuator of a first pair of actuators are connected to corresponding supporting floor pivot points, the supporting floor pivot points of the first and second actuators of the first actuator pair being situated beneath the motion platform but further towards the center of mass of the motion platform than the first of the three pivot points on the underside of the motion platform.

13. An actuator assembly comprising:

a pair of interconnected extensible actuators, the actuators defining two sides of a triangle;

a linkage connected to each of the actuators of the pair of actuators, the linkage comprising an elongate rod mounted between the actuators, a sleeve being slidably mounted on the rod and connected to a pair of arms, each of the arms being connected to a respective one of the pair of actuators;

the actuators being driven to maintain a constant position of the linkage;

means for detecting changes in position of the linkage.

14. An actuator assembly according to claim 13, wherein the arms are pivotally connected to the actuators and the sleeve.

15. An actuator assembly according to claim 13, wherein the actuators are pivotally connected together and pivotally mounted on respective pivots located on a supporting surface to define a triangular structure.

16. An actuator assembly according to claim 13, wherein means are provided to control the actuators such that the linkage is maintained in a datum position.

17. An actuator assembly according to claim 16, wherein a warning output is generated in the event of the linkage being displaced from the datum position.

18. An actuator assembly comprising:

three pairs of interconnected extensible actuators, the actuators of each pair defining two sides of a triangle;

a linkage for each pair of actuators, each linkage being connected to each of the actuators of its pair of actuators;

the actuators being driven to maintain a constant position of the linkage;

means for detecting changes in position of each linkage, wherein the three pairs of interconnected extensible actuators are positioned between a motion platform and a supporting floor, the motion platform having lateral edges and longitudinal edges, each pair of actuators being connected to a corresponding one of three pivot points on an underside of the motion platform, each of the three pivot points being substantially equi-distant from a center of mass of the motion platform; and wherein a first of the three pivot points on the underside of the motion platform is mid-way between longitudinal edges of the motion platform, and wherein a second of the three pivot points on the underside of the motion platform is at a first longitudinal edge of the motion platform, and wherein a third of the three pivot points on the underside of the motion platform is at a second longitudinal edge of the motion platform.

19. An actuator assembly according to claim 18, wherein the actuators of each pair are connected to respective pivot points on the supporting floor, and wherein a first pair of actuators has a first actuator of its pair connected to a first pivot point on the supporting floor, the first pivot point on the supporting floor of the first actuator of the first actuator pair being spaced away from the first longitudinal edge of the motion platform but closer to a lateral edge of the motion platform than the pivot point on the underside of the motion platform to which the first actuator of the first actuator pair is attached, the second actuator of the first actuator pair being connected to a second pivot point on the supporting floor, the second pivot point being beneath the first longitudinal edge of the motion platform.

20. An actuator assembly according to claim 18, wherein the actuators of each pair are connected to respective pivot points on the supporting floor, and wherein first and second actuators of a first pair of actuators are connected to corresponding supporting floor pivot points, the supporting floor pivot points of the first and second actuators of the first actuator pair being situated beneath the motion platform but further towards the center of mass of the motion platform than the first of the three pivot points on the underside of the motion platform.

21. A motion system comprising:

a motion platform, the motion platform having lateral edges and longitudinal edges;

a supporting floor;

three pairs of interconnected extensible actuator assemblies for upholding the motion platform above the supporting floor, the actuators of each pair defining two sides of a triangle;

each pair of actuators being connected to a corresponding one of three pivot points on an underside of the motion platform, each of the three pivot points being substantially equi-distant from a center of mass of the motion platform;

wherein a first of the three pivot points on the underside of the motion platform is mid-way between longitudinal edges of the motion platform, and wherein a second of the three pivot points on the underside of the motion platform is at a first longitudinal edge of the motion platform, and wherein a third of the three pivot points on the underside of the motion platform is at a second longitudinal edge of the motion platform;

wherein the actuators of each pair are connected to respective pivot points on the supporting floor, and wherein the second pair of actuators has a first actuator of its pair connected to a first pivot point on the supporting floor, the first pivot point on the supporting floor of the first actuator of the second actuator pair being spaced away from the first longitudinal edge of the motion platform but closer to a lateral edge of the motion platform than the pivot point on the underside of the motion platform to which the first actuator of the second actuator pair is attached, the second actuator of the second actuator pair being connected to a second pivot point on the supporting floor, the second pivot point being beneath the first longitudinal edge of the motion platform.

22. The apparatus of claim 21, wherein the actuators of each pair are connected to respective pivot points on the supporting floor, and wherein the first and second actuators of the first pair of actuators are connected to corresponding supporting floor pivot points, the supporting floor pivot points of the first and second actuators of the first actuator pair being situated beneath the motion platform but further towards the center of mass of the motion platform than the first of the three pivot points on the underside of the motion platform.

23. A motion system comprising:

a motion platform, the motion platform having lateral edges and longitudinal edges;

a supporting floor;

three pairs of interconnected extensible actuator assemblies for upholding the motion platform above the supporting floor, the actuators of each pair defining two sides of a triangle;

each pair of actuators being connected to a corresponding one of three pivot points on an underside of the motion platform, each of the three pivot points being substantially equi-distant from a center of mass of the motion platform;

a linkage for each pair of actuators, each linkage being constrained to move with the actuators of its pair of actuators such that differences in extension of the actuators cause a change in position of the linkage.

24. The apparatus of claim 23, further comprising means for detecting changes in the position of the linkage.

* * * * *